March 16, 1937.   T. I. DUFFY   2,073,736
RESILIENT MOUNTING FOR BICYCLE WHEELS
Filed July 23, 1935
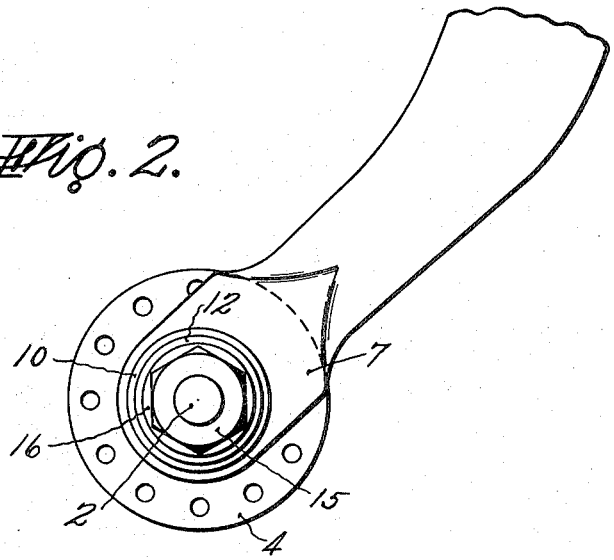
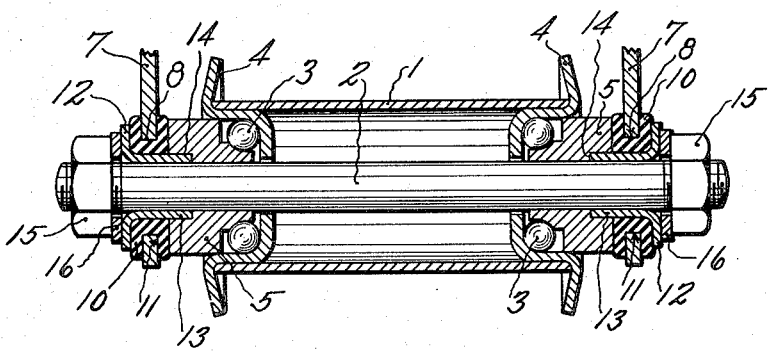
INVENTOR.
Thomas I. Duffy
BY Chapin & Neal
ATTORNEYS Patented Mar. 16, 1937

2,073,736

UNITED STATES PATENT OFFICE 2,073,736

RESILIENT MOUNTING FOR BICYCLE WHEELS

Thomas I. Duffy, Detroit, Mich., assignor to The Westfield Manufacturing Company, Westfield, Mass., a corporation of Massachusetts Application July 23, 1935, Serial No. 32,776

3 Claims. (Cl. 208—101)

This invention relates to an insulated wheel mounting for bicycles.

The principal object of the invention is to provide a mounting of this character which will prevent the transmission of road shocks and vibrations from the wheel to the bicycle frame and accomplish this without sacrifice of strength in the mounting. Further and more specific objects reside in the details of the construction and assembly by which the material of the insulating member, preferably rubber, is subject to a uniform compression, the degree of which is predetermined at the time of assembly of the wheel and frame without reliance on the discretion of the workman.

In the accompanying drawing, which illustrates one embodiment of my invention—

Fig. 1 is a transverse sectional view of the wheel and adjacent parts of the frame assembly; and Fig. 2 is a side view of the structure of Fig. 1, looking from the left of the latter figure.

Referring to the drawing, which shows the invention as it is applied to the front fork of the bicycle, the wheel hub 1 is shown rotatably mounted on the wheel axle 2 by means of ball bearings, the balls 3 of which are held in raceways formed by outer members 4, fitted into the ends of the hub, and inner or cone race members 5 fitted on the end portions of the axle 2 and extending into the members 4.

The fork tips, indicated at 7, are provided with apertures 8 through which the ends of the axle 2 extend. The apertures 8 are somewhat larger in diameter than the diameter of the axle and are provided with annular insulating members 10 preferably formed of rubber. Members 10 are formed on their outer periphery with a groove 11 in which the edge or marginal portions of the apertures 8 tightly engage. Washers 12 are formed with tubular extensions 13 which are interposed between members 10 and axle 2, the inner race members 5 being counter-bored at 14 to receive the free ends of extensions 13. The ends of the axle are threaded to receive nuts 15, conventional washers 16 being interposed between nuts 15 and washers 12.

The lengths of the extensions 13 and the depth of the counter-bores 14 are so chosen with respect to the transverse thickness of members 10 that when nuts 15 are turned onto the ends of the axle to seat the ends of extensions 13 tightly against the end walls of the counter-bores 14 the members 10 will be compressed a predetermined amount between washers 12 and the outer ends of race members 5. The tightening of the nuts at the same time properly seats the balls 3 of the wheel bearings between the race members 4 and 5.

The contact of extensions 13 with the end walls of the counter-bore 14 assures the desired compression of the insulating member so that the compounding of the rubber material of which that member is preferably made can be so chosen as to give maximum efficiency and durability under working conditions. Furthermore, the thrust of nuts 15 in adjusting the tightness of the ball bearing race members is transmitted directly to the race members 5 through the metal members 13 independently of the insulating member 10, so that the strength and rigidity of the hub-axle assembly are unimpaired while the fork tip 7 is completely insulated from that assembly by members 10. Stated in another way, the novel construction of the present invention permits the insulating members and the wheel bearings to be independently but simultaneously conditioned for their respective functions by a routine assembly of the parts.

It will thus be seen that substantially ideal conditions are initially obtained. A further advantage of the structure resides in the action of the parts when through wear of the parts such as the ball engaging surfaces of the race members the initial conditions change. It will be obvious that so long as the nuts 15 hold their position, outward movement of members 13 and race member 5 is prevented by the nuts. If the ball bearing surfaces become worn, however, race members 5 may move inwardly out of engagement with members 13, and are urged to do so by the tendency of the compressed rubber insulating member 10 to expand. Upon wearing of the parts this action takes place, preventing rattling and to a degree maintaining proper operation of the bearings. When this happens the efficiency of operation of the insulating members and the bearings are both somewhat impaired, but acceleration of the wear due to looseness of the parts is prevented and proper conditions can be restored by setting up nuts 15 to again bring the members 5 and 13 into contact.

I claim:

1. In a wheel mounting for a bicycle the combination of a frame element having an opening, a wheel axle extending through the opening, insulating material extending through said opening and over the portions of the side faces of the frame element adjacent said opening to encase the marginal portions of the opening in insulating material, rigid members supported on the axle to engage said insulating material on opposite sides of the frame element and adapted to engage each other through said opening, and means to force said rigid members into engagement with each other to apply a predetermined degree of compression to the insulating material and secure the axle to the frame element.

2. In a wheel mounting for a bicycle the combination of a frame element having an opening, a wheel axle extending through the opening, insulating material extending through said opening and over the portions of the side faces of the frame element adjacent said opening to encase the marginal portions of the opening in insulating material, a rigid tubular member, through which the axle passes, extending through said opening and provided on its outer end with a flange engaging the outer insulated face of the frame element, a second rigid member forming the inner cone element of a ball bearing race for the bicycle wheel, the outer end of said cone element engaging the inner insulated face of the frame element, a counter-bore formed in the outer end of the cone element to receive the inner end of said tubular member, and a nut threaded on the end of the axle and acting against the flange of the tubular member to compress the insulating material between the latter and the cone element, the degree of compression so imposed on the insulating material being limited by the depth of the counter-bore.

3. In a wheel mounting for a bicycle the combination of a frame element having an opening, a wheel axle extending through the opening, an annular insulating member provided with a channel on its outer peripheral face in which the marginal portions of the opening engage, a rigid tubular member fitting between the insulating member and the axle and extending into said opening, the tubular member being provided on its outer end with an outwardly extending flange engaging the outer side face of the insulating member, a second rigid member forming the inner cone element of a ball bearing race for the bicycle wheel, the outer end of said cone element engaging the inner side face of the insulating element, and a nut threaded on the end of the axle and acting against the flange of the tubular member to compress the insulating member between the latter and the cone member, the degree of compression so imposed on the insulating member being limited by the engagement of the tubular and cone members.

THOMAS I. DUFFY.